May 14, 1968        P. F. FERREIRA        3,383,246

ROTATABLE SOLAR ENERGY CONVERTER

Filed Dec. 3, 1963        3 Sheets-Sheet 1

Paul F. Ferreira
INVENTOR.

BY Clarence A. O'Brien
and Harvey B. Jacobson
Attorneys

May 14, 1968 P. F. FERREIRA 3,383,246
ROTATABLE SOLAR ENERGY CONVERTER
Filed Dec. 3, 1963 3 Sheets-Sheet 3

Paul F. Ferreira
INVENTOR.

BY Clarence A. O'Brien
and Harvey B. Jacobson
Attorneys

United States Patent Office 3,383,246
Patented May 14, 1968

3,383,246
ROTATABLE SOLAR ENERGY CONVERTER
Paul F. Ferreira, P.O. Box 111, Honolulu, Hawaii 96810
Filed Dec. 3, 1963, Ser. No. 327,675
3 Claims. (Cl. 138—89)

ABSTRACT OF THE DISCLOSURE

A plurality of circumferentially spaced photo-voltaic, solar cells mounted on the peripheral, heat conductive rim of a rapidly rotating wheel, the speed of which is selected so that each solar cell is intermittently exposed to concentrated rays of the sun for short intervals exceeding however the minimum time required for the energy conversion process to be completed. Optical solar light traps concentrate the sun's rays at focal points lying on the peripheral rim of the wheel beyond the solar cells.

---

This invention relates to apparatus for converting radiant or solar energy into a more useful form.

It is therefore a primary object of the present invention to provide a device through which radiant energy such as the rays of the sun may be intercepted in a novel manner for conversion into an electrical energy.

An additional object of the present invention is to provide apparatus through which the photo-voltaic conversion of radiant energy into a different form is accomplished in an efficient, novel and practical manner utilizing conversion cells such as referred to in Patent Nos. 2,946,945, 2,989,575 and 2,191,353.

In accordance with the foregoing objects, the present invention exposes a continuously moving energy-absorbing surface to one or more fixedly mounted light traps, said energy-absorbing surface being moved at a linear speed commensurate with the rate of energy conversion. Radiant energy may thereby be converted into electrical energy at an optimum rate which is also dependent upon suitable temperatures for collection of the electrical energy.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 6 is a diagrammatic view of a portion of the energy converter.

Figure 1:
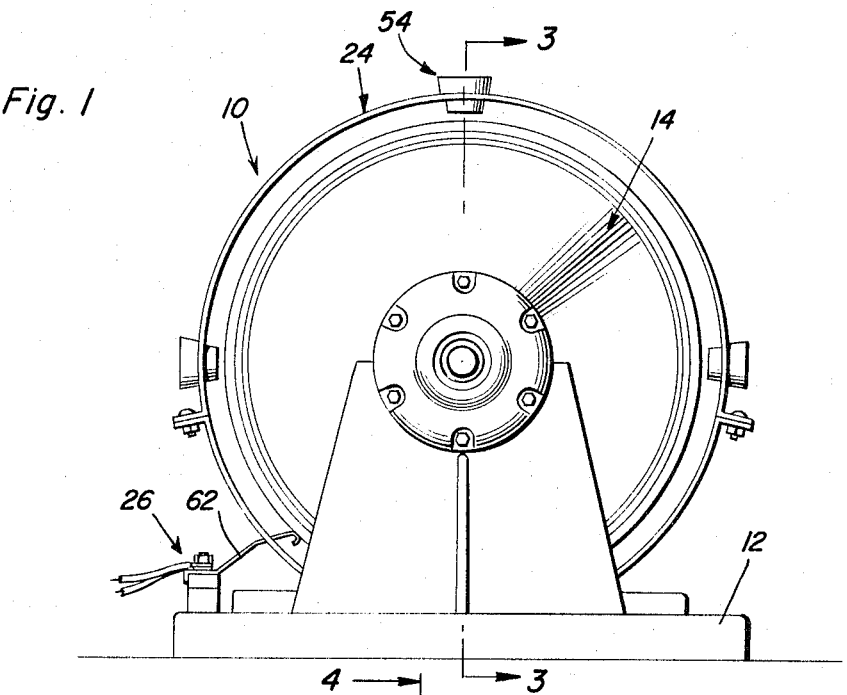
FIGURE 1 is a front elevational view of one form of solar energy converter made in accordance with the principles of the present invention.
Figure 2:
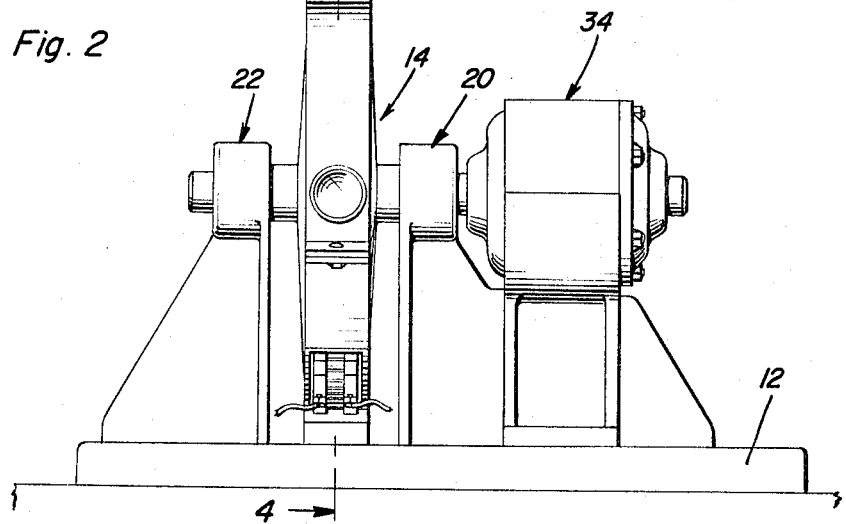
FIGURE 2 is a side elevational view of the apparatus illustrated in FIGURE 1.
Figure 3:
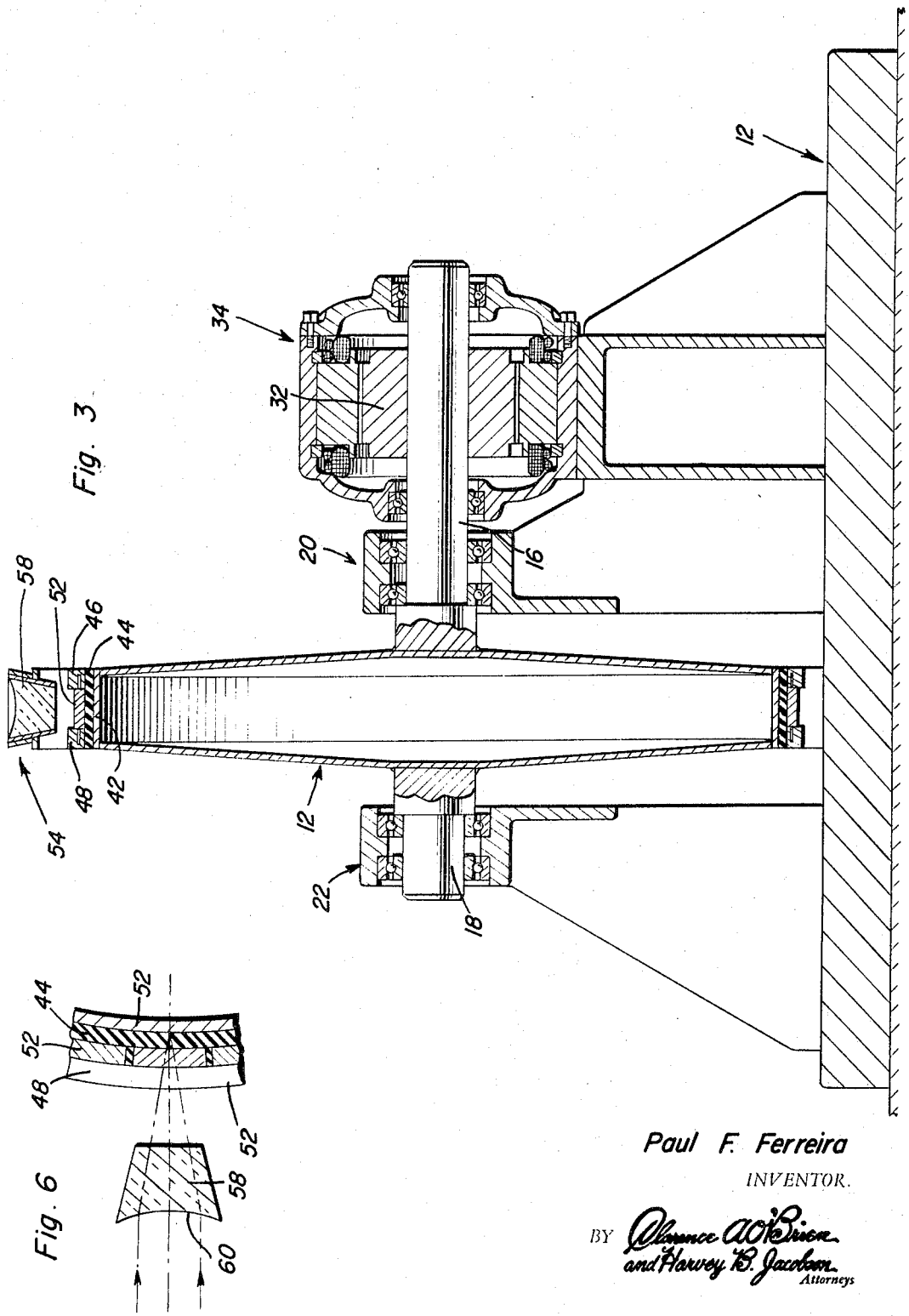
FIGURE 3 is a sectional view taken substantially through a plane indicated by section line 3—3 in FIGURE 1.
Figure 4:
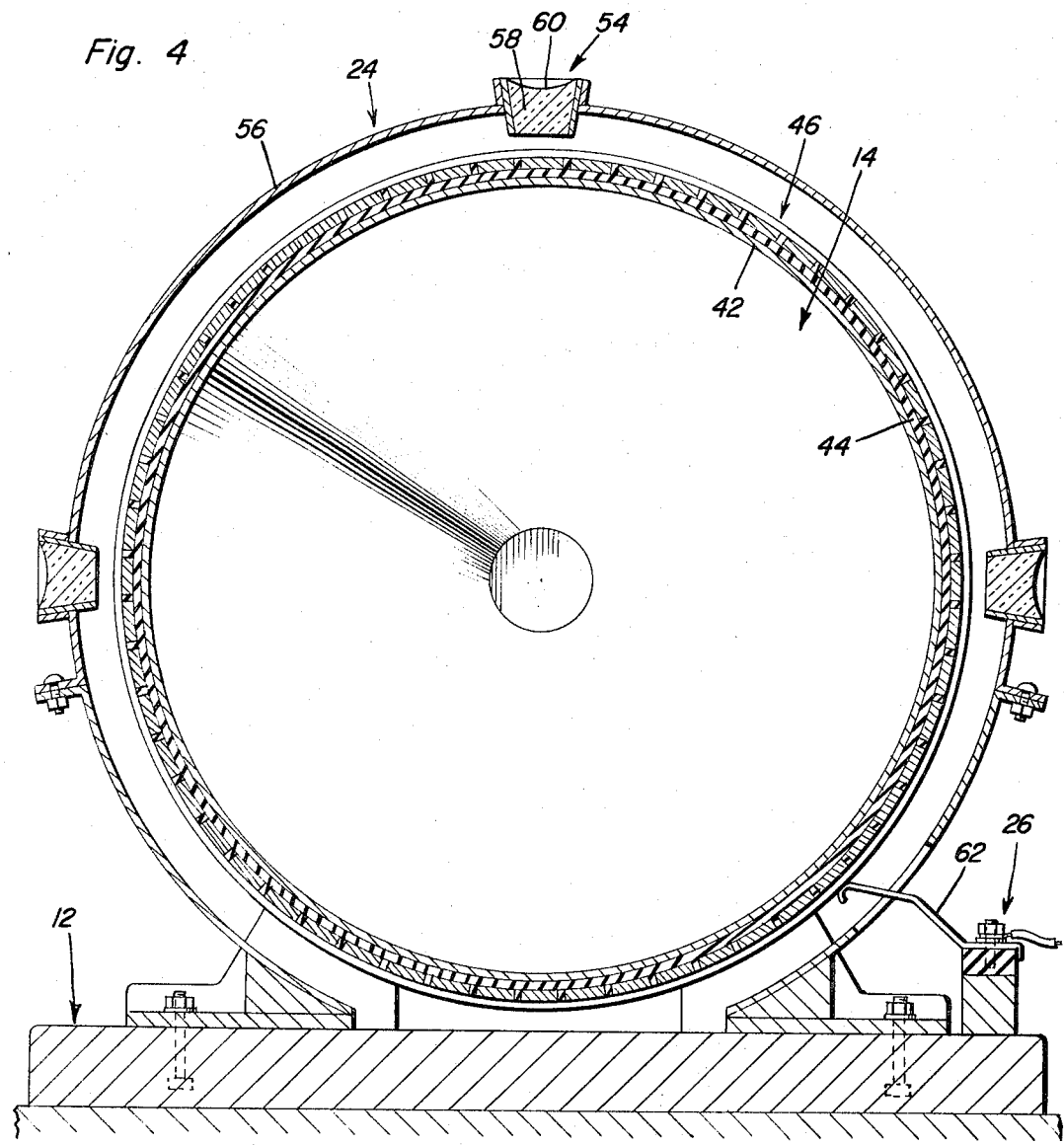
FIGURE 4 is sectional view taken substantially through a plane indicated by section line 4—4 in FIGURE 2.

Referring now to the drawings in detail, it will be observed that the solar energy converter generally referred to by reference numeral 10 may be mounted on any suitable base stucture 12 by means of which a wheel assembly generally referred to by reference numeral 14 may be oriented to an optimum position so as to receive the most intense radiation from the sun or any other source of radiant energy. The wheel assembly is therefore rotatably mounted by coaxial shaft assemblies 16 and 18 which extend from opposite axial sides thereof, said shaft assemblies being journaled by bearing assemblies 20 and 22 mounted on the base 12. Mounted about the wheel assembly for the purpose of intercepting and concentrating radiant energy thereon, is a radiant energy trap assembly generally referred to by reference numeral 24. Mounted on the base 12 adjacent to the wheel assembly, is a terminal post 26 through which electrical energy is collected as more clearly seen in FIGURES 1 and 3. The shaft assembly 16 is connected to the armature 32 of an electric motor 34, the stator of which is supported on the base 12 in coaxial relation to the shaft assemblies to that movement may be imparted to the wheel assembly 14 at the proper speed. It should be appreciated that a plurality of such wheel assemblies may be mounted for simultaneous movement.

Figure 5:
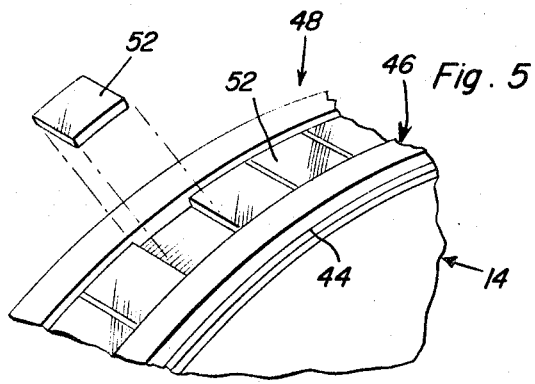
FIGURE 5 is an enlarged perspective view of a disassembled portion of the energy converter.

Mounted on the outer conductive rim 42 of the wheel assembly, is a transparent electrical insulating layer or ring 44. Mounted on the insulating ring 44 are a pair of parallel commutator rings 46 and 48 composed of spaced segments 50 as more clearly seen in FIGURE 5. Electrically connected between the commutator rings and mounted on the insulating ring 44 between the commutator rings, are a plurality of closely spaced photo-voltaic cells 52 such as the silicon P-N junction type of solar cells referred to in the patents aforementioned, said cells being spaced by non-conductive spacers so as to individually generate electrical energy when exposed to light energy for a sufficient length of time during which such energy conversion occurs. This will of course depend upon the nature of the radiant energy absorbing device and the phenomenon occurring therein. When exposed to solar radiation, photo-voltaic cells for example, may involve six to twenty microseconds for conversion to electrical energy. Therefore, the linear speed of the outer rim 42 of the wheel assembly on which the cells 52 are mounted, must be selected commensurate with the time necessary for the conversion process to occur which in the case of the photo-voltaic cells would be limited to six microseconds.

The solar trap assembly 24 therefore consists of a mounting ring 56 supported on the base 12. The light concentrating devices 54 are therefore circumferentially spaced in close adjacency to the outer rim of the wheel assembly so that light rays may be concentrated thereon. Each device 54 therefore includes a lens element 58 having a parabolic receiving surface 60 so as to cause light rays to converge on a focal point located on the outer rim 42 as more clearly seen in the diagram of FIGURE 6. The light rays will be intercepted by the photo-voltaic cells 52 after they pass the light converging lens elements 58. When converting light rays into electricity the light rays are controlled to converge on an imaginary focal point beyond the fixed position of the photo-voltaic cell, in order to regulate the intensity of the solar radiation. The electrical energy generated as a result thereof, will be collected by brush elements 62 mounted on the terminal post 26 and engaging the collector rings 46 and 48 for such purpose. It should be explained at this point that the present invention does not reside in the electrical circuit facilities for collecting the electrical energy generated by the conversion cells 52 nor in the structure of these cells. The availability of technology sufficient for persons skilled in the art to select conversion cells and connect them in a circuit for collecting the energy derived therefrom is demonstrated by the issuance of the U.S. patents aforementioned. The mounting arrangement of the converter cells 52 in relation to the other described components on the other hand, constitutes the departure of the present invention from the prior art. The light concentrating lens devices 54 are circumferentially spaced about the wheel assembly as shown for receiving the optimum amount of solar energy when the apparatus is properly orientated with respect to the direction of the earth's movement relative to the sun. As an alternative, the mounting ring 24 for the light converging lens device 54 or devices, may be slowly rotated about the axis of the wheel assembly by a clock mechanism so as to be in the optimum position at all times for receiving the sun's rays and concentrating said rays on the outer rim of the wheel assembly. It will also be appreciated, that the linear speed of the outer rim of the wheel assembly may be selected in accordance with the surface speed of the earth relative to the sun and the speed of radiant energy therefrom in order to receive the maximum amount of energy and to uniformly distribute such radiant energy on the entire outer rim.

Another factor in determining the optimum linear speed of the outer rim of the wheel assembly, will be the rate at which heat is removed therefrom so as to prevent or reduce re-radiation and/or to regulate the temperature of the outer rim in accordance with the temperature requirements of the photo-voltaic cells mounted thereon. Toward this latter end, any suitable means may be provided for absorbing the heat from the outer rim.

Relativity will show an absolute structure of space time. The speed of solar radiation or light is approximately 12-billion inches per second, while the speed of the earth's rotation is approximately 57,564 inches per second. If the earth rotated twice in 24-hours it would collect twice the solar energy. Following this synchronized theory or phenomenon, the wheel assembly may be driven at a circumferential speed of approximately 67,000 inches per second (among other speeds) which speed is a few thousand inches over the speed of the earth's rotation. Thus, each photovoltaic cell is made to rotate at a speed commensurate with the reaction of the photovoltaic cell to solar radiation (6-20 microseconds). For example, a wheel whose diameter is 78-inches would have a periphery or circumference area of 244.92 inches. Using 225 1-inch photovoltaic cells around the periphery and having the wheel rotate at a speed of 300 revolutions per second (300 r.p.s.) 67,500 cells would pass each light trap or a given point. If four light traps were utilized equidistant to each other, the 270,000 cells would be exposed to the solar radiation in one second of time. It will be understood that any type of a radiation trap having a reasonable efficiency may be employed, but at no time should the parabolic surface or condensing lens thereof be focused on the photovoltaic cell. The focal point should instead be adjusted at a point past the photovoltaic cell.

The system of light traps when designed to resolve clockwise to clock accuracy, is orientated in an east to west (sunrise to sunset) direction, encasing the high speed wheel or solar energy converter. The wheel assembly may then be provided with ventilation for the purpose of keeping a safe temperature for the best efficiency of the photovoltaic cells.

From the foregoing description, the construction, operation and utility of the solar energy converter will be apparent. It will therefore be appreciated, that the described apparatus provides a highly efficient means for converting radiant energy in general into more useful forms including electrical energy, and wherein the conversion involves collection of the maximum amount of energy under the time, season geographical location and atmospheric conditions prevailing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for converting radiant energy from a source into electrical energy including, a rotatable wheel assembly having an outer periphery, means mounting said wheel for rotation about a horizontal axis from which heat is adapted to be removed, energy trap means mounted adjacent said outer periphery for concentrating said radiant energy thereon, a plurality of solar energy conversion, means mounted on and covering substantially said outer periphery for intercepting said radiant energy concentrated thereon, and powered means for rotating said wheel assembly for continuous movement of said outer periphery relative to the source thereby intermittently exposing at least one of the solar energy conversion means to the radiant energy for predetermined intervals during which electrical energy is generated therefrom.

2. The combination of claim 1, wherein said energy trap means comprises, a plurality of circumferentially spaced light converging lens devices operatively mounted about the wheel assembly, each lens device having a focal point located on the outer periphery beyond the solar energy conversion means.

3. The combination of claim 1 wherein said solar energy conversion means comprises a plurality of closely spaced photo-voltaic cells and in insulating ring secured to the outer periphery on which said solar cells are non-conductively spaced from each other.

References Cited

UNITED STATES PATENTS

| | | | |
|---|---|---|---|
| 389,124 | 9/1888 | Weston | 136—206 X |
| 588,177 | 8/1897 | Reagan | 136—206 |
| 2,788,381 | 4/1957 | Baldwin | 136—89 |
| 2,864,879 | 12/1958 | Toulmin | 136—208 |
| 2,919,353 | 12/1959 | Paradise | 136—89 X |
| 2,951,163 | 8/1960 | Shaffer et al. | 136—89 X |
| 2,989,575 | 6/1961 | Wallice | 136—89 |
| 3,064,063 | 11/1962 | Imelmann | 136—230 X |
| 3,070,699 | 12/1962 | Lehmann et al. | 136—89 X |

FOREIGN PATENTS

| | | |
|---|---|---|
| 430,974 | 8/1911 | France. |
| 108,354 | 3/1925 | Switzerland. |

OTHER REFERENCES

Dale et al.—14th Ann. Proc. Power Sources Conf. (10/1960) p. 22–25.

Mann—14th Ann. Proc. Power Sources Conf. (10/1960) p. 28–32.

WINSTON A. DOUGLAS, *Primary Examiner.*

A. M. BEKELMAN, *Assistant Examiner.*